United States Patent [19]
Ehrlich

[11] Patent Number: 5,752,791
[45] Date of Patent: May 19, 1998

[54] CARGO SECUREMENT ASSEMBLY

[75] Inventor: Rodney P. Ehrlich, Monticelli, Ind.

[73] Assignee: Wabash National Corporation, Lafayette, Ind.

[21] Appl. No.: 363,594

[22] Filed: Dec. 23, 1994

Related U.S. Application Data

[63] Continuation of Ser. No. 063,023, May 17, 1993, abandoned.

[51] Int. Cl.$^6$ ........................................................ B60P 7/08
[52] U.S. Cl. ........................................ 410/101; 410/104
[58] Field of Search .............................. 410/104, 105, 410/111, 116, 101, 102, 103, 106, 107, 108, 109, 110, 112, 113, 114; 403/348; 24/115 K, 265 CD

[56] References Cited

U.S. PATENT DOCUMENTS

| 2,733,671 | 2/1956 | Sheesley et al. | 410/114 |
| 2,939,406 | 6/1960 | Wilkoff | 410/115 |
| 3,252,681 | 5/1966 | Watts | 410/116 |
| 3,300,171 | 1/1967 | Watts | 410/116 |
| 3,323,186 | 6/1967 | Rennert | 410/116 |
| 3,381,925 | 5/1968 | Higuchi | 410/116 |
| 3,685,778 | 8/1972 | Berns | 410/116 |
| 3,814,029 | 6/1974 | McNally et al. | 410/111 |
| 4,592,585 | 6/1986 | Oren et al. | 410/109 X |
| 4,810,027 | 3/1989 | Ehrlich | 296/181 |
| 4,867,623 | 9/1989 | Loyd | 410/105 |
| 5,265,992 | 11/1993 | Jensen | 410/116 |

FOREIGN PATENT DOCUMENTS

| 602270 | 7/1960 | Canada | 410/116 |

OTHER PUBLICATIONS

Ancra International Catalog No. 206; pp. 16–23; Oct. .1987; cargo restraint equipment.

*Primary Examiner*—Stephen Gordon
*Attorney, Agent, or Firm*—Trexler, Bushnell, Giangiorgi & Blackstone, Ltd.

[57] ABSTRACT

A cargo securement assembly for stabilizing freight cargo upon a transport vehicle or the like, includes a support panel secured to the transport vehicle and has a circular aperture formed through the panel so that circumferential panel surfaces circumscribe the circular aperture. A coupling clip, which can form the end of any cargo engagement member, is releasably insertable through the circular aperture and has an articulated locking structure releasably engageable against one of the circumferential panel surfaces to enable removably anchoring the coupling clip within the aperture. The coupling clip and the locking structure can be slidably rotatable relative to the circumferential panel surfaces while maintaining axial locking engagement thereagainst in order to adjust orientation of the coupling clip and anchoring in the assembly. The support panel can be the sidewall of the cargo compartment so that the aperture opens through the exterior surface and has a weather-protective covering thereon.

8 Claims, 2 Drawing Sheets

CARGO SECUREMENT ASSEMBLY

This application is a continuation of application U.S. Ser. No. 08/063,023 filed May 17, 1993, now abandoned.

BACKGROUND OF THE INVENTION

This invention relates to securement devices employed for example to stabilize freight cargo upon transport vehicles or the like. Highway truck trailers currently have cargo restraint systems in which various restraining bars or flexible belts have end clips which are coupled an extended bracket or track mounted on the sidewall of the cargo compartment or trailer. The conventional coupling clip has an elongate configuration which is inserted into one of a series of correspondingly elongate rectangular slots punched or fabricated along the length of the track. While the track may be mounted either horizontally or vertically, alone or in combinations, on the trailer sidewall, the clips must be consequently inserted and oriented in either a corresponding vertical or horizontal orientation of the receptive slot, and therefore irregular, or angular locking of the clip into the track has not been possible, so that twisting of the flexible web has been required when irregular or angular restraint surfaces on the cargo go in the belt orientation. This and other disadvantages are eliminated by the cargo securement assembly in accordance with the present invention.

SUMMARY OF THE INVENTION

In accordance with the present invention, a cargo securement assembly for stabilizing freight cargo upon a transport vehicle or the like, includes a support panel secured to the transport vehicle and having a circular aperture formed through the panel so that circumferential panel surfaces circumscribe the circular aperture. A coupling clip, which can form the end of any cargo engagement member, is releasably insertable through the circular aperture and has an articulated locking structure releasably engageable against one of the circumferential panel surfaces to enable removably anchoring the coupling clip within the aperture. The coupling clip and the locking structure can be slidably rotatable relative to the circumferential panel surfaces while maintaining axial locking engagement thereagainst in order to adjust orientation of the coupling clip and anchoring in the assembly.

In a preferred embodiment, the support panel is defined by the sidewall of the cargo compartment so that the aperture opens through the exterior surface and has a weather-protective covering thereon.

DESCRIPTION OF THE ILLUSTRATED EMBODIMENT

Figure 1:
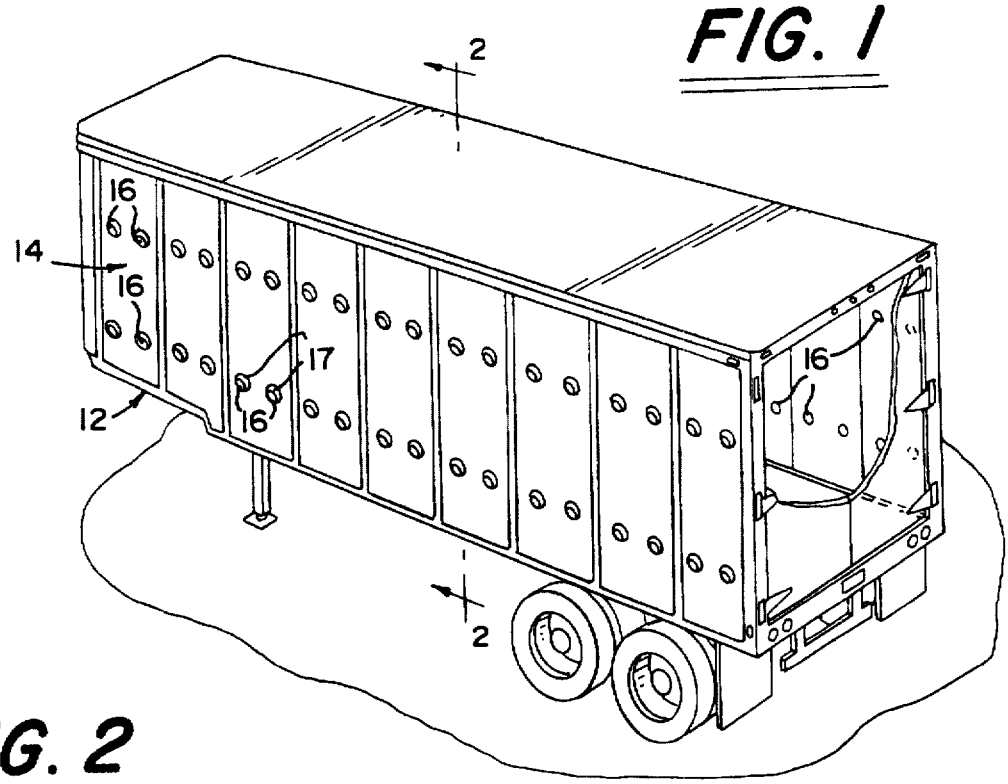
FIG. 1 is perspective view of a highway semi-trailer illustrating cargo securement apertures through the sidewall plates in one embodiment of the cargo securement assembly in accordance with the invention.
Figure 2:
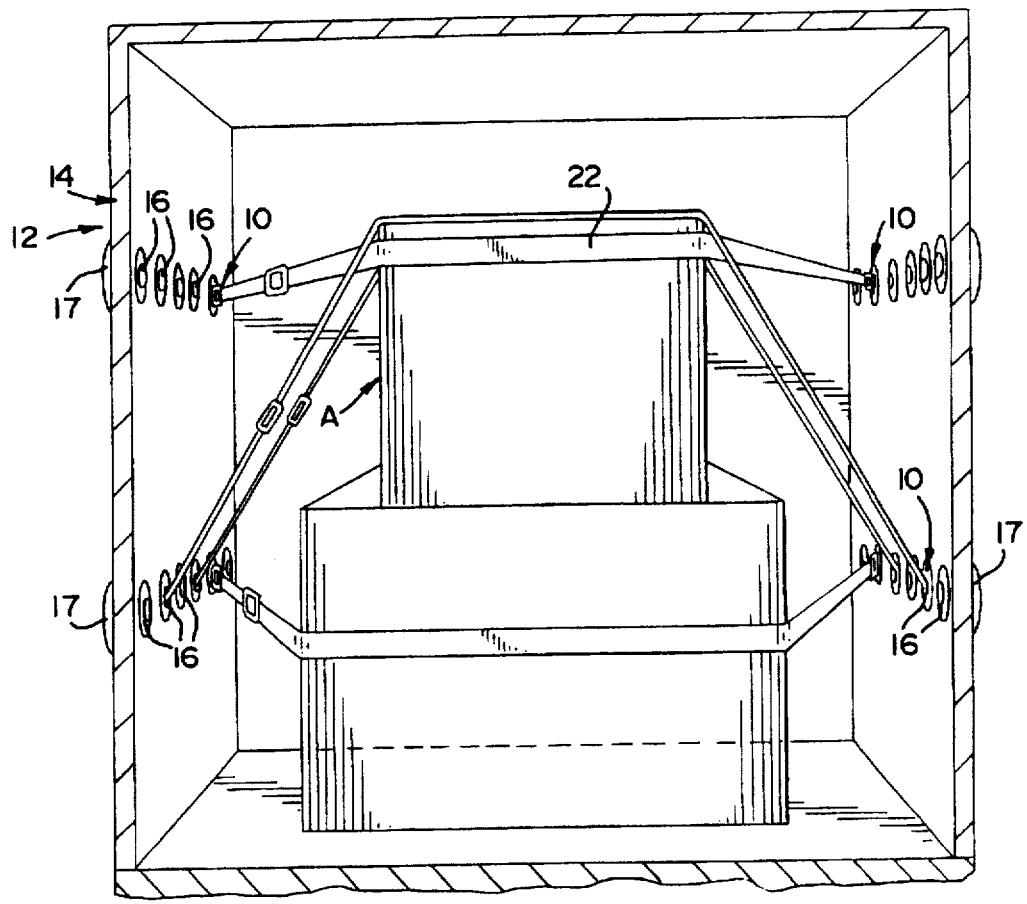
FIG. 2 is an end view of the cargo compartment showing FIG. 1 in which cargo is stabilized by belts whose ends are anchored by coupling clips within the sidewall panel apertures.

Referring to FIGS. 1 and 2, one embodiment of a cargo securement assembly in accordance with the present invention is generally designated by a reference character 10. The securement assembly 10 is shown employed, for example, to stabilize cargo A within a typical highway tractor semi-trailer 12 having a conventional plate and post panel construction as more fully described in U.S. Pat. No. 4,810,027 which is incorporated by reference for complete discussion of panel construction. In the illustrated embodiment, each of the panel plates 14 has a plurality of cargo securement circular apertures 16 entirely through the plate which may have a thickness of approximately 0.16 inch or more when preferably fabricated from aluminum. Since the circular apertures 16 are formed through the plates, a weather-protective cover 17 is secured on the exterior surface over the aperture opening.

Figure 3:
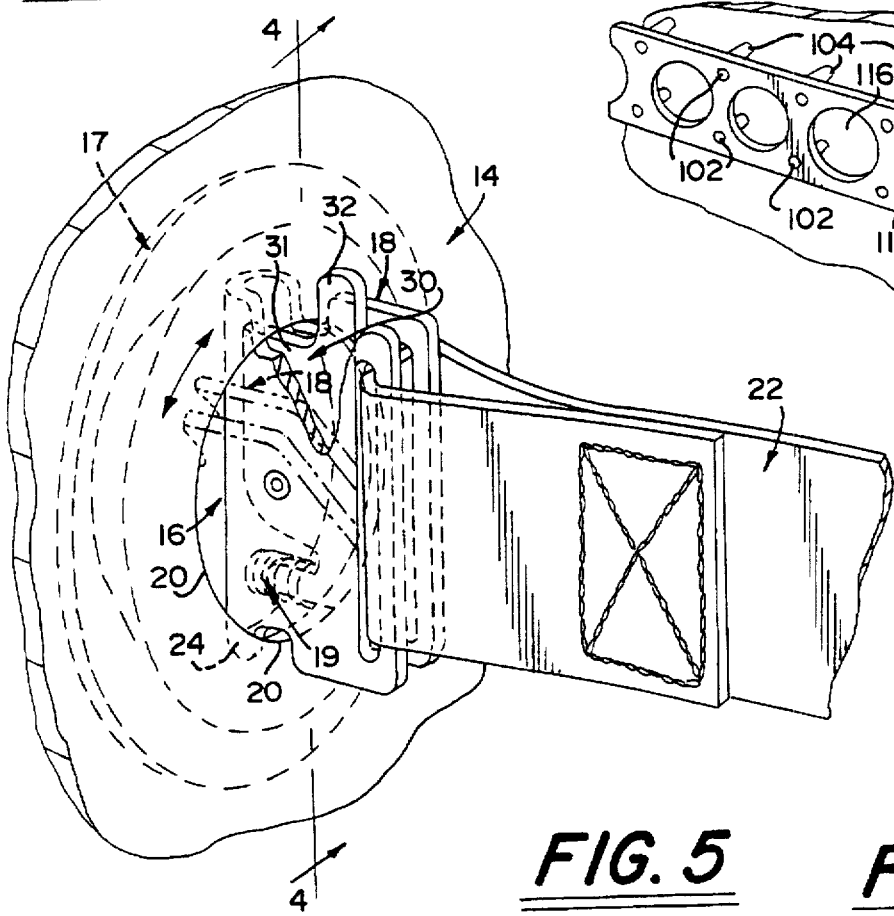
FIG. 3 is a perspective and partially sectional view of the anchored coupling clip and panel aperture shown in FIG. 2.

Referring now to FIG. 3, the illustrated embodiment of the securement assembly 10 includes a conventional coupling clip shown designated by reference character 18 which is removably inserted into and releasably anchored to the circumferential wall 20 of one of the circular apertures 16. The clip structure 18 in an aperture thereby, has attached the looped end of a typical web belt 22 which is stretched across the cargo A as illustrated in FIG. 2.

Figure 4:
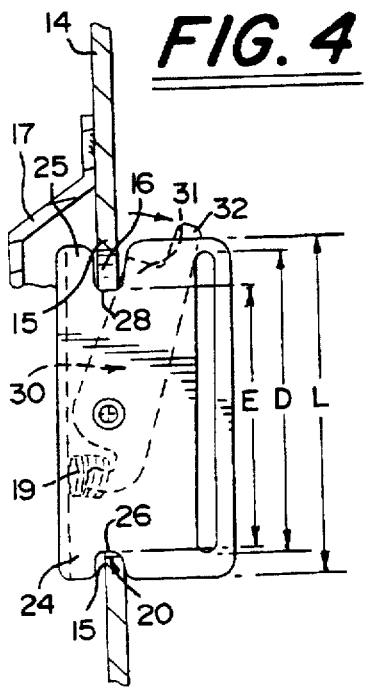
FIGS. 4–6 illustrate steps in the reversible, removal or insertion of the coupling clip within the panel aperture showing FIG. 3.
Figure 5:
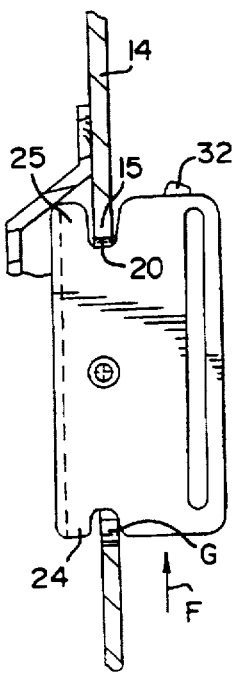

As shown in FIGS. 3 and 4, the conventional clip structure 18 has a pair of spaced anchoring ears 24 and 25 which extend a terminal length L somewhat longer than the diameter D of the circular aperture 16 so that the ears 24 and 25 engage the exterior peripheral panel surface 15 adjacently circumscribing the circular aperture 16. Adjacent to the clip ears 24 and 25 are a pair of edge notches 26 and 28 which are longitudinally spaced across the clip 18 at a length E which is somewhat smaller than the aperture diameter D. The clip structure 18 has an internal spring 19 bearing on latch member 30 which normally biases a gate portion 31 into a closed position substantially filling the notch 28, as shown in FIG. 3, which thus blocks any substantial transverse motion of the clip in diagonal direction across the plane of the aperture 16 to resist any vibrational displacement of the locked clip assembly within the aperture when the web belt is tensioned for cargo securement. In addition, the latch 30 includes a projecting grip portion 32 by which the latch 30 can be manually deflected from the spring biased, closed position of FIG. 3 to withdraw the gate portion 31 from the notch 28 as shown in FIG. 4. As shown in FIG. 5, the deflection of the gate portion 31 from the notch 28 in open position enables transverse motion of the clip 18 in the direction of the arrow F generally along the diameter D of the aperture 16 creating a clearance space G between the circumferential surface 20 and the interior surface of the notch 26 through which the adjacent ear 24 can be passed when the clip is angularly tilted relative to the panel 14 with a pivotal motion of the notch 28 against the diametrically opposite peripheral surface 20 leading the other adjacent ear 25 through the aperture 16 allowing complete withdrawal of the clip 18 along the directional arrow H in FIG. 6 when the web belt 22 is removed from the cargo A.

Figure 6:
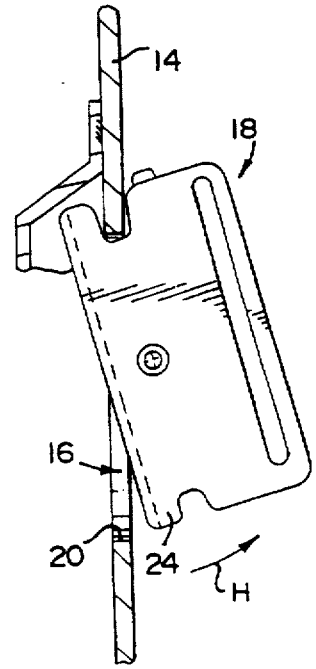

In order to insert the clip 18 through the aperture 16 to tension the web belt and secure or stabilize the cargo, reversal of the indicated motions from the positions from FIG. 6 to FIG. 4 is achieved by initially displacing the latch 30 to open the gate portion 31 unblocking the notch 28 so that the ear 25 is first inserted through the aperture 16 and the notch 28 is pivoted against the circumferential surface 20 to then insert the ear 24 through the aperture 16 into the position shown in FIG. 5 whereafter the entire clip structure 18 can be lowered in direction reversed to the arrow F into the position shown in FIG. 4, and thereafter the grip portion 32 can be manually released so that the gate portion 31 again closes the notch 28 to lock the assembly in the position shown in FIG. 3.

Referring again to FIG. 3, an additional advantage of the assembly 10 is the ability of the clip 18 and the ears 24 and 25 to slidably rotate relative to the circumferential panel surfaces 15 and 20 of the aperture 16 while maintaining axial locking engagement thereagainst in order to accommodate easy adjustment in any angular orientation of the clip and the anchoring in the assembly, for example when a cargo surface requires a non-rectilinear angle for stabilization. Moreover, the rotatable adjustment of the clip 18 against the periphery of the aperture can be achieved merely by manually gripping the sides of the clip without need for operation of the lock structure 30 or gripping portion 32 since the gate portion 31 need not be deflected when simply pivoted within the circumferential aperture surface 20 as indicated in FIG. 3.

Figure 7:
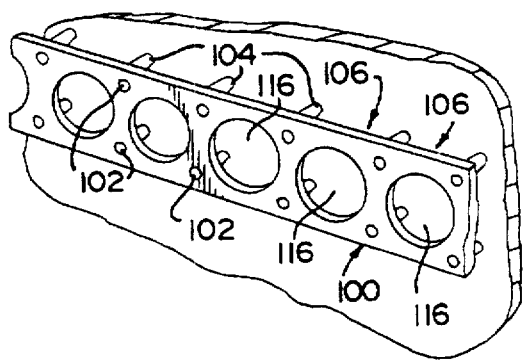
FIG. 7 is a fragmentary perspective view of a tract bracket in another embodiment of the cargo securement assembly in accordance with the invention.

Referring now to FIG. 7, in another embodiment, the circular apertures 116 can be provided through a bracket generally designated by a reference character 100 which can be mounted on the sidewall of a trailer or container. For example, in this illustrated embodiment fasteners 102 pass through spacers 104 on the back of the bracket 100 to create a clearance space 106 between the back of the bracket 100 and the sidewall 114 which accommodates the locking ears of the coupling clip (not shown).

The invention claimed is:

1. A cargo securement assembly for stabilizing freight cargo upon a transport vehicle or container comprising:

a support panel means for securement to a transport vehicle, having at least one circular aperture formed through said panel means and defining circumferential panel surfaces circumscribing said circular aperture; a coupling clip member releasably insertable through said circular aperture and having an articulating locking structure comprising an opening selectively closed in a locked position by a pivotal gate, said opening being arranged to receive insertion therein of a portion of said circumferential panel surfaces when said gate is selectively pivoted away from said opening to an unlocked position thereof, so that said coupling clip member is releasably engageable against one of said circumferential panel surfaces to enable removable anchoring of said coupling clip member within said aperture in said assembly.

2. An assembly according to claim 1 wherein said clip member and locking structure are slidably rotatable relative to said circumferential panel surfaces while maintaining axial locking engagement thereagainst in order to adjust orientation of said clip member and anchoring in said assembly.

3. An assembly according to claim 1 wherein said clip member comprises coupling means for attachment of a cargo engagement structure.

4. An assembly according to claim 3 wherein said coupling means comprises an aperture for attachment of a belt member forming said cargo engagement structure.

5. An assembly according to claim 1 wherein said support panel means is defined by a vehicle sidewall and said circular aperture opens therethrough to the exterior free surface of the said sidewall.

6. An assembly according to claim 1 wherein said support panel means comprises a bracket having a plurality of said circular apertures formed therethrough.

7. A cargo securement assembly for stabilizing freight cargo within a transport compartment, comprising:

a pair of opposing side panels, each panel including an assembly of adjacent vertical plates joined by supporting vertical posts; at least one of said plates having at least one circular aperture formed therethrough and defining circumferential plate surfaces circumscribing said circular aperture; and a coupling clip member releasably insertable through said circular aperture and having an articulating locking structure comprising an opening selectively close in a locked position by a pivotal gate, said opening being arranged to receive insertion therein of a portion of said circumferential plate surfaces when said gate is selectively pivoted away from said opening to an unlocked position thereof, so that said coupling clip member is releasably engageable against one of said circumferential plate surfaces to enable removable anchoring of said coupling clip member within said aperture in said assembly.

8. An assembly according to claim 7 wherein said clip member and locking structure are slidably rotatable relative to said circumferential plate surfaces while maintaining axial locking engagement thereagainst in order to adjust orientation of said clip and anchoring in said assembly.

* * * * *

UNITED STATES PATENT AND TRADEMARK OFFICE
CERTIFICATE OF CORRECTION

PATENT NO. : 5,752,791
DATED      : May 19, 1998
INVENTOR(S) : Rodney P. Ehrlich It is certified that error appears in the above-indentified patent and that said Letters Patent is hereby corrected as shown below:

Column 3, Line 28  "114"  should have been deleted

Column 4, Line 46  "clip"  should be -- clip member --

Signed and Sealed this

Sixth Day of October, 1998

Attest:

BRUCE LEHMAN

Attesting Officer     Commissioner of Patents and Trademarks